Dec. 22, 1942.       P. GRAMATZKI       2,305,807
CROSS-COUNTRY VEHICLE
Filed Oct. 24, 1939       2 Sheets-Sheet 1
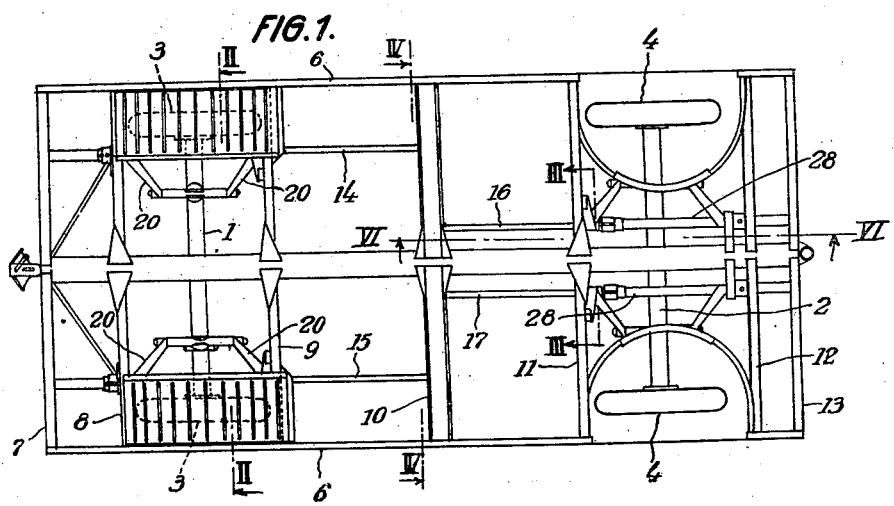
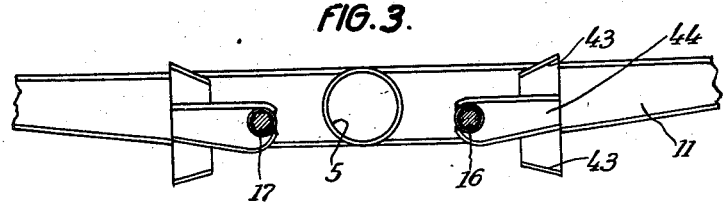
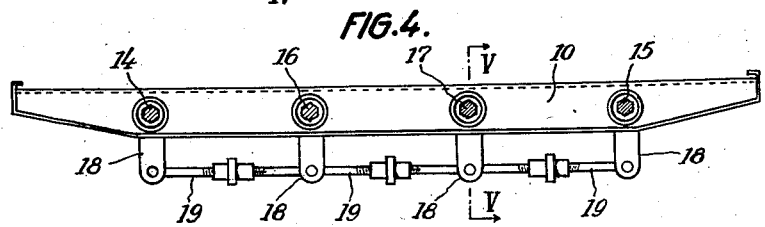
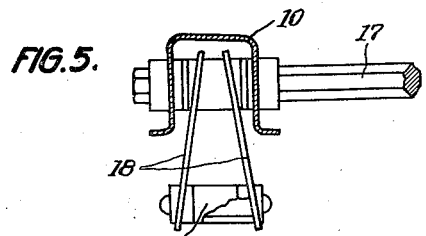
Inventor,
P. Gramatzki
By
Glascock Downing & Seebold
Attorneys.

Dec. 22, 1942. P. GRAMATZKI 2,305,807
CROSS-COUNTRY VEHICLE
Filed Oct. 24, 1939 2 Sheets-Sheet 2
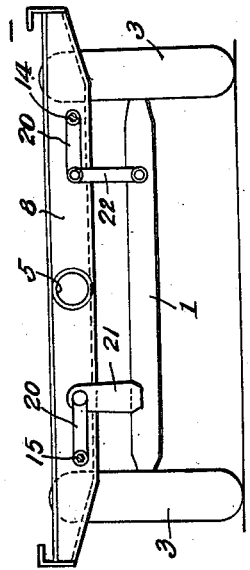
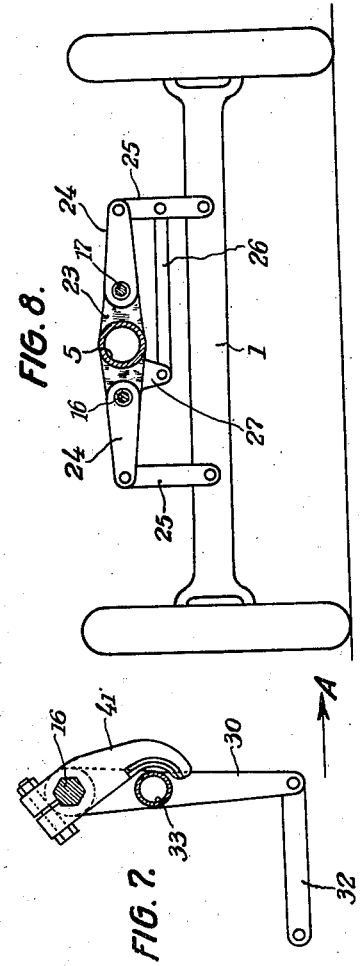
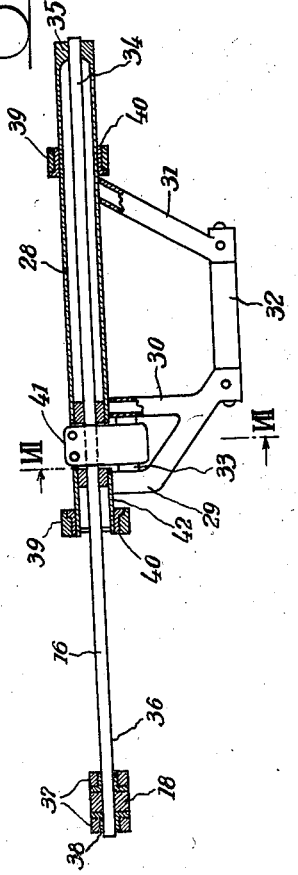
Inventor
P. Gramatzki
By
Glascock Downing Seebold
Attorneys.

Patented Dec. 22, 1942

2,305,807

UNITED STATES PATENT OFFICE 2,305,807

CROSS-COUNTRY VEHICLE

Paul Gramatzki, Boizenburg-on-the-Elbe, Germany; vested in the Alien Property Custodian Application October 24, 1939, Serial No. 301,017
In Germany September 30, 1938

5 Claims. (Cl. 280—124)

Vehicles with jointed cross shaft axles are known, in which each wheel on the same axle is supported by a separate spring. There is neither a compensation of the front wheels with regard to the rear wheels nor even a compensation of one wheel with regard to the other wheel on the same axle. But there are also so-called suspended axles, where the axles with the two wheels can assume an oblique position, thus effecting a compensation of the one wheel with regard to the other wheel on the same axle. It has been proposed to bring about a compensation between the one axle and the other axle of a cross-country vehicle by means of tension members. These constructions are partly very complicated and, therefore, expensive, partly unserviceable in practical operation owing to the action of the tension members which tend to slackening and are conducted over guide pulleys.

It is also known to mount the wheels by means of torsion rods, but although in this case the torsion rods on one side of the vehicle are connected with the torsion rods on the other side in order to effect a compensation, the wheels are mounted on the torsion rods by means of short axle journals or axle arms.

The invention obviates these disadvantages in a cross-country vehicle in which the wheels are under the influence of torsion spring rods, by distributing the latter over the length of the vehicle in such a way that one pair of torsion spring rods is provided for each passing axle of two or more wheels, the torsion spring rods being connected with each other for the sake of compensation.

The invention is illustrated by way of example in the accompanying drawings, in which—

Fig. 1 is a plan view of a cross-country vehicle according to the invention (some details being omitted for clearness of illustration), Fig. 2 is a sectional view taken on the line II—II of Fig. 1 on a larger scale, Fig. 3 is a partial section taken on the line III—III of Fig. 1 on a larger scale, Fig. 4 is a section taken on the line IV—IV of Fig. 1 on a larger scale, Fig. 5 is a cross section taken on the line V—V of Fig. 4 on a more enlarged scale, Fig. 6 is a longitudinal section and a plan view of details on a larger scale, taken on the line VI—VI (Fig. 1), Fig. 7 is a section taken on the line VII—VII of Fig. 6 on a larger scale, Fig. 8 is a view of one of the axles of the vehicle according to the invention in a somewhat different construction on a larger scale.

In the drawings, 1 and 2 denote two axles with wheels 3, 4. In the constructional example illustrated in the drawings, the chassis frame is formed by a central longitudinal tube 5, longitudinal beams 6, and transverse beams 7 to 13.

According to the invention, torsion spring rods are distributed along the vehicle in such a manner that one pair of torsion spring rods 14, 15 and 16, 17 respectively is provided in the illustrated constructional example for each of the axles 1 and 2.

In the illustrated example, the torsion spring rods are connected with each other for compensation by arms 18 mounted thereon and by adjustable compensation members 19.

In the constructional example shown in Fig. 1, the axle on the left side of the figure is, merely for the sake of explanation, connected by rocking arms or bodies directly with torsion spring rods 14 and 15, whereas on the right side of the figure a different type of connection is provided, which will be explained later on.

In the form of construction according to Fig. 2, rocking arms or bodies 20 are secured to the torsion spring rods, connected to the one end of the axle by a body 21 rigidly secured thereto, and to the other end of the axle by a pivoted arm 22.

In the form of construction according to Fig. 8, the arrangement is somewhat different. In this case, the axle 1 is connected to a member 23 rigidly disposed in the centre of the frame of the vehicle by pairs of pivoted arms 24, 25. One arm 25 is pivotally connected by means of a guide member 26 to a lug 27 carried by the member 23.

The axles are not connected directly to the torsion spring rods 16, 17, but, as shown on the right side of Fig. 1 and more distinctly in Fig. 6, the rocking arms or bodies connected to the axle are secured to a tube 28 surrounding the torsion spring rod, for example 16 or 17, the tube being fixed to this rod in the direction of rotation but being movable in longitudinal direction. This means that the torsion spring rod 16, when twisted and therefore shortened, can move with regard to the tube 28 along the latter. In this respect, Fig. 6 shows a special construction. Instead of simple rocking arms, connecting the tube 28 with the one end of the axle, a rocking body is provided in this case and is rigidly secured to the tube 28, for example by welding. This rocking body consists of the arms 29, 30, 31 as well as a jointed member 32. Between the arms 29 and 30 there is arranged an engaging web 33. Whereas the one end 34 of the torsion spring rod is shiftable in the tube 28 but will not turn in the latter, as indicated at 35, the other end 36 is shiftable in the respective compensation arm 18 in longitudinal direction, but is secured against turning therein.

The torsion spring rod 16 is mounted in the transverse beam 10 by means of a special mounting piece 37 which is connected to the beam, bushes 38 being rotatably disposed in this mounting piece. Advantageously, this mounting is constructed as a non-lubricated mounting. The tube 28 is mounted in a similar manner in mounting pieces 39, inside which bushes 40 are rotatably disposed.

In the construction according to Figs. 6 and 7, an engaging member 41 is secured to the torsion spring rod 16, and the tube 28 only reaches up to this engaging member, whereas on the other side of the latter there is a short tube 42 merely for convenient mounting of the rocking body. When the end of the axle connected to the members 32, 30 moves in the direction of the arrow A, the engaging web 33, after a certain oscillation of the end of the axle, bears against the engaging member 41. Thus, the further motion of the end of the axle in the direction of the arrow A acts directly on the portion of the torsion spring rod 16 on the left of the engaging member 41 in Fig. 6, whereby the spring action is considerably increased and a bend is caused in the characteristic line of the spring support.

To one of the transverse beams, for example to the transverse beam 11, there are secured stops 43, against which the rocking arms 20 or rocking bodies 29, 30, 31 can bear directly. In the constructional example in Fig. 3 there are special stops 44 secured to the torsion spring rods for this purpose.

The invention offers the advantage of very rapid decaying of the vertical oscillations set up in the wheels, in contradistinction to helical or leaf springs. As compared with vehicles the wheels of which are mounted on leaf springs, the subject of the invention has the further advantage that a lateral motion of the wheels, as is caused by the lateral deflection of the leaf springs, cannot occur, so that the vehicle does not run in undesired curves. It is also important that, in case of breakage of one of the torsion spring rods, contrary to the breaking of a spring in spring mounted axles, the disturbance in driving is not so serious as in the latter case. It is even possible to make a provisional repair on the road by fitting a sleeve that connects the broken ends. The vehicle has a low weight and small height, a good position on the road, and its motions are relatively noiseless.

What I claim is:

1. A cross-country vehicle consisting of a chassis frame, transverse beams therein, two longitudinal torsion rods extending over approximately one half of the length of the vehicle disposed inside in the vehicle and rotatably mounted in two transverse beams of the chassis frame, two further torsion rods extending over approximately the other half of the length of the vehicle disposed more outside in the vehicle and rotatably mounted in two transverse beams of the chassis frame, arms at one end rigidly secured to the inner ends of the torsion rods, link members connecting all other ends of these arms with each other, rocking arms secured to the inner torsion rods extending outwardly, rocking arms secured to the outer torsion rods extending inwardly, a rigid front axle and a rigid rear axle, wheels on these axles, and connecting means between the ends of the rocking arms and the ends of the axles.

2. A cross-country vehicle consisting of a chassis frame, transverse beams therein, two longitudinal torsion rods of polygonal cross-section extending over approximately one half of the length of the vehicle disposed inside in the vehicle and rotatably mounted in two transverse beams of the chassis frame, two further torsion rods of polygonal cross-section extending over approximately the other half of the length of the vehicle disposed more outside in the vehicle and rotatably mounted in two transverse beams of the chassis frame, arms at one end rigidly secured to the inner ends of the torsion rods, adjustable compensating links connecting the other ends of these arms with each other, rocking arms secured to the inner torsion rods extending outwardly, rocking arms secured to the outer torsion rods extending inwardly, a rigid front axle and a rigid rear axle, wheels on these axles, and connecting means between the ends of the rocking arms and the ends of the axles.

3. A cross-country vehicle consisting of a chassis frame, transverse beams therein, two longitudinal torsion rods extending over approximately one half of the length of the vehicle disposed inside in the vehicle and rotatably mounted in two transverse beams of the chassis frame, two further torsion rods extending over approximately the other half of the length of the vehicle disposed more outside in the vehicle and rotatably mounted in two transverse beams of the chassis frame, arms at one end rigidly secured to the inner ends of the torsion rods, adjustable link members connecting the other ends of these arms with each other, rocking arms secured to the inner torsion rods extending outwardly, rocking arms secured to the outer torsion rods extending inwardly, a rigid front axle and a rigid rear axle, wheels on these axles, a rigid connecting piece on one end of each axle, and a pivoted connecting piece on the other end of each axle between the axles and the rocking arms.

4. A cross-country vehicle consisting of a chassis frame, transverse beams therein, two longitudinal torsion rods extending over approximately one half of the length of the vehicle disposed inside in the vehicle and rotatably mounted in two transverse beams of the chassis frame, two further torsion rods extending over approximately the other half of the length of the vehicle disposed more outside in the vehicle and rotatably mounted in two transverse beams of the chassis frame, arms at one end rigidly secured to the inner ends of the torsion rods, adjustable link members, connecting the other ends of these arms with each other, rocking arms secured to the inner torsion rods extending outwardly, rocking arms secured to the outer torsion rods extending inwardly, a rigid front axle and a rigid rear axle, a central longitudinal beam extending in the length of the vehicle, two arms on both sides pivoted to this longitudinal beam, a guide member connecting each of the ends of the two axles with the ends of said arms, a guide member connecting the central part of the one guide member at the outer end of the axle with the central longitudinal beam, and wheels on these axles.

5. A cross-country vehicle consisting of a chassis frame, transverse beams in said frame, two longitudinal torsion rods extending over approximately one-half of the length of the vehicle disposed inside in the frame and rotatably mounted in a compensating and adjusting bridge in the central part of the vehicle, a tube surrounding the outer ends of the torsion rods rotatably mounted in one transverse beam at one end of the chassis frame, a rigid connection at the outer ends of the tubes and the torsion springs, an engaging web secured to each of the inner ends of the tubes, an engaging member secured approximately in the center of the torsion rods adapted upon vertical deflection of the chassis frame to come into contact with the engaging webs, two further torsion rods longitudinally extending over approximately the other half of the length of the frame rotatably mounted in the inner end in said compensating and adjusting bridge, a tube surrounding the outer ends of said torsion rods rotatably mounted in one transverse beam at one end of the chassis frame, a rigid connection at the outer ends of the tubes and the torsion springs, an engaging web secured to each of the inner ends of the tubes, an engaging member secured approximately in the center of the torsion rods adapted upon vertical deflection of the chassis frame to come into contact with the engaging webs, arms at one end rigidly secured to the inner ends of the torsion rods, adjustable compensating links connecting the other ends of these arms with each other, rocking arms secured to the tubes surrounding the torsion springs extending outwardly at the inside torsion springs and extending inwardly of the torsion springs, a rigid front axle and a rigid rear axle, wheels on said axles, a pivoted connecting piece connecting each of the ends of the axles with the respective rocking arm, and a guide member connecting one rocking arm of each axle with a fixed point of the chassis frame.

PAUL GRAMATZKI.